United States Patent
BrightSky et al.

(10) Patent No.: US 8,861,736 B2
(45) Date of Patent: *Oct. 14, 2014

(54) RELIABLE PHYSICAL UNCLONABLE FUNCTION FOR DEVICE AUTHENTICATION

(71) Applicant: International Business Machines Corporation, Armonk, NY (US)

(72) Inventors: Matthew J. BrightSky, Pound Ridge, NY (US); Chung H. Lam, Peekskill, NY (US); Dirk Pfeiffer, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,688

(22) Filed: Nov. 19, 2012

(65) Prior Publication Data
US 2014/0140513 A1   May 22, 2014

(51) Int. Cl.
  *H04L 29/00*  (2006.01)
  *H04L 9/08*  (2006.01)
  *G06F 21/60*  (2013.01)

(52) U.S. Cl.
  CPC  *H04L 9/08* (2013.01); *G06F 21/60* (2013.01); *H04L 9/0816* (2013.01)
  USPC ........................................... 380/278

(58) Field of Classification Search
  CPC ......... G06F 21/60; G06F 21/78; G06F 21/88; H04L 9/08; H04L 9/3278
  USPC ................. 380/44, 46, 278; 713/189; 257/48; 365/46; 438/17
  See application file for complete search history.

(56) References Cited

U.S. PATENT DOCUMENTS

| | | | |
|---|---|---|---|
| 8,525,169 B1 * | 9/2013 | Edelstein et al. | 257/48 |
| 2006/0271792 A1 * | 11/2006 | Devadas et al. | 713/189 |
| 2006/0284160 A1 * | 12/2006 | Khouri et al. | 257/4 |
| 2008/0165569 A1 * | 7/2008 | Chen et al. | 365/163 |
| 2008/0279373 A1 * | 11/2008 | Erhart et al. | 380/46 |
| 2009/0080242 A1 * | 3/2009 | Resta et al. | 365/163 |
| 2010/0165719 A1 * | 7/2010 | Pellizzer | 365/163 |
| 2011/0116309 A1 * | 5/2011 | Lung | 365/163 |
| 2013/0044874 A1 * | 2/2013 | Murray | 380/44 |
| 2013/0155766 A1 * | 6/2013 | Liu | 365/163 |
| 2013/0198436 A1 * | 8/2013 | Bandic et al. | 711/103 |

OTHER PUBLICATIONS

Kursawe et al. "Reconfigurable Physical Unclonable Functions-Enabling Technology for Tamper-Resistant Storage", IEEE International Workshop on Hardware-Oriented Security and Trust, 2009, HOST '09. Jul. 2009, pp. 22-29, print ISBN: 978-1-4244-4805-0.*

* cited by examiner

*Primary Examiner* — Hadi Armouche
*Assistant Examiner* — Shahriar Zarrineh
(74) *Attorney, Agent, or Firm* — Louis J. Percello

(57) ABSTRACT

A method of manufacturing a secure device having a physical unclonable function includes embedding a phase change memory in the secure device, where the phase change memory includes a plurality of cells, and setting the phase change memory in a manner that results in a phase variation over the plurality of cells, wherein the phase variation is the physical unclonable function. A method for retrieving a cryptographic key from an integrated circuit, wherein the cryptographic key is stored in the integrated circuit, includes measuring a property of a phase change memory embedded in the integrated circuit, wherein the phase change memory includes a plurality of cells and the property is a function of a phase variation over the plurality of cells, deriving a signature from the property, and deriving the cryptographic key from the signature.

16 Claims, 5 Drawing Sheets

RELIABLE PHYSICAL UNCLONABLE FUNCTION FOR DEVICE AUTHENTICATION

FIELD OF THE DISCLOSURE

The present disclosure relates to device authentication, and more particularly to physical unclonable functions for integrated circuits.

BACKGROUND OF THE DISCLOSURE

Hardware based "Root of Trust" is a fundamental building block for any secure computing system. Key elements of secure computing require authentication, sending data to an authorized source, and/or loading data onto a designated device. In general, cryptographic keys in binary code form the basis of securing data and bit streams. Typically, such cryptographic keys are stored in non-volatile memory and are present on an integrated circuit (IC) at all times. If an attacker can extract the key from a device, the entire foundation for secure computing is in jeopardy. For example, an attacker with physical access to the device can delayer a chip, and read out the stored code based on the state of the transistors. Thus, securing cryptographic keys requires anti-tamper technologies, which may be relatively expensive and may therefore not be suitable for implementation in various devices like field programmable gate arrays (FPGAs), mobile devices, and sensors.

SUMMARY OF THE DISCLOSURE

A method of manufacturing a secure device having a physical unclonable function includes embedding a phase change memory in the secure device, where the phase change memory includes a plurality of cells, and setting the phase change memory in a manner that results in a phase variation over the plurality of cells, wherein the phase variation is the physical unclonable function.

A method for retrieving a cryptographic key from an integrated circuit, wherein the cryptographic key is stored in the integrated circuit, includes measuring a property of a phase change memory embedded in the integrated circuit, wherein the phase change memory includes a plurality of cells and the property is a function of a phase variation over the plurality of cells, deriving a signature from the property, and deriving the cryptographic key from the signature.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

Figure 1:
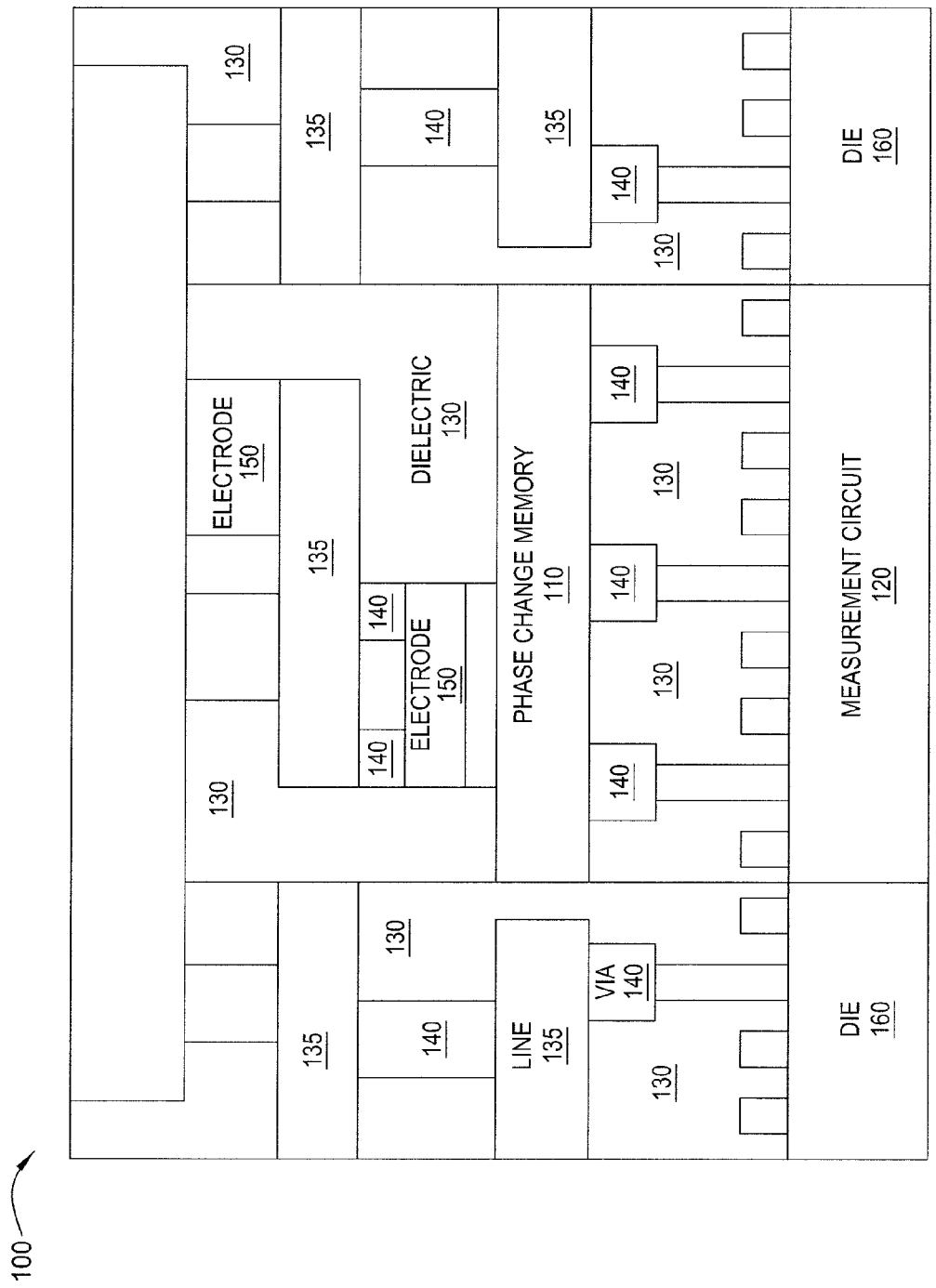
FIG. 1 illustrates an exemplary device comprising an integrated circuit, according to embodiments of the present disclosure.

Embodiments of the present disclosure include secure devices having unique physical properties, or physical unclonable functions (PUFs) for storing secret codes used for authentication and key generation. A physical unclonable function comprises a set of unique analog values from structures and materials that can be measured on chip (e.g., by a measurement circuit) followed by conversion to a code, or key, in binary form. The present disclosure describes a set of unique materials and structures that can be used as physical unclonable functions. For example, a device having a unique physical unclonable function according to embodiments of the present disclosure may include an integrated circuit including a phase change memory (PCM) as an embedded non-volatile memory. The resistance values of the individual cells of the PCM, which can be set at different stages between fully amorphous (i.e., high resistance) and fully crystalline (i.e., low resistance), collectively represent a physical unclonable function. As such, physical properties of the phase change memory can then be measured to derive a signature (e.g., by way of one or more analog response measurements), from which a binary key can be further derived.

One of the principles behind a PUF is that the cryptographic key(s) are not stored in binary form when the chip is powered down but are hidden in the form of unique physical analog identifiers within the hardware so that the code can only be executed on a designated authorized uncompromised IC. Thus, when a circuit is turned on, the structures comprising the PUF can be measured and the analog values converted into a binary code (or key) using an on chip measurement circuit. For example, a measurement circuit may be employed on chip such as that described in Suh, et al. "Physical Unclonable Functions for Device Authentication and Secret Key Generation", Proceedings of the 44$^{th}$ Design Automation Conference, San Diego, Calif., June 2007, which is herein incorporated by reference in its entirety. However, if the chip is turned off, the binary code is not stored in any memory, but is implicit in the properties of the chip.

Prior approaches to using physical unclonable functions for authentication and key generation focus on device structures that have been optimized during manufacturing to have reduced variability, since the usual intent is high performance and reproducibility. However, if an array of device(s) used to provide a physical unclonable function has a narrow variability range close to a cutoff threshold set by a measurement device used to compute a binary code from the physical unclonable function, any slight change over time and temperature may result in bit errors. The threshold set by the measurement circuit may determine whether to categorize various values of the signature as ones or zeros. In this way, a key, such as in the form of a binary code, can be derived from the signature, the key comprising an identifier that is unique to the device and that can be used for authenticating the device. However, it may be a particular problem when a particular analog value is close to a threshold. If the analog value changes even slightly, then the signature can change. For instance, the value can be read as a one, when it should be read as a zero. It is possible to deal with this problem using error correction bits. However, this may reduce the security of the code because the greater redundancy and error tolerance in the code, the less reliable it is as a security mechanism.

In contrast to the foregoing, various embodiments of the present disclosure purposefully increase the variability in the measurable physical properties of a phase change memory. Integrated circuits often include embedded non-volatile memory, which may take the form of phase change memory. Phase change memory is memory formed from a material, such as chalcogenide glass, that switches between multiple states (e.g., crystalline, amorphous, and/or other states) in response to applied heat (which may be produced by the passage of an electric current). In particular, the individual cells of the PCM are set to different states or phases having varying degrees of crystallinity. The random distribution of different phases within the PCM results in a range of different resistivity values that can be utilized as a PUF.

In some embodiments, the variability is created by applying a programming pulse that sets and resets the PCM, resulting in a variable, or random, pattern of crystallinity among the cells of the PCM. In one embodiment, the programming pulse is applied by one or more electrodes or reactive materials (e.g., contacts or photoelectric cells) connected to the PCM. For example, in some embodiments, a current pulse between 200 and 500 μA for several nanoseconds is sufficient to set or reset a cell of the PCM. In other embodiments, the variability is created by performing a laser anneal on the PCM. This induces the PCM to form variable, or random, patterns of crystallinity. An advantage of the laser anneal approach is that it requires less support circuitry to characterize and compute the PUF.

Compared to prior approaches for physical unclonable functions, embodiments of the present disclosure have a wide range/variability in measurable physical properties (e.g., resistance response), and provide PUFs with greater reliability and with less susceptibility to bit errors. By increasing the variability of the physical properties, the likelihood is reduced that a particular value is at or near a threshold of a measurement device used to compute a binary code from the physical unclonable function. Thus, even if the PUF changes due to temperature or aging, it is less likely that a binary key derived from the PUF will drift significantly over time and temperature. The variability achievable through embodiments of the present disclosure is significant enough to provide a great number of unique PUFs for a wide variety of devices. In addition, the number of PUF values achievable' is large enough avoid attackers guessing specific patterns.

To aid in understanding the present disclosure, FIG. 1 illustrates a cross-section of an exemplary device 100 (e.g., a substrate or integrated circuit and a measurement circuit) related to embodiments of the present disclosure. In particular, the device 100 includes a substrate (or die) 160 which may be comprised of crystalline silicon, gallium arsenide (GaAs), or other semiconductors, as well as other materials for forming transistors, resistors, capacitors, and other structures. Although the example of FIG. 1 refers to a die 160, the present disclosure is not so limited. For example, the die may be one of many dies (chips) that may be formed from a common wafer or substrate. Thus, embodiments of the present disclosure may incorporate a wafer or substrate prior to separation of multiple dies. The die 160, which forms part of the front end of the integrated circuit, may include an on chip measurement circuit 120 which reads one or more physical properties of the phase change memory (PCM) 110 used for the PUF, as described in further detail below. The die may also include one or more electrodes 150 (e.g., contacts or photoelectric cells) connected to the PCM 110 and configured to apply a programming pulse (i.e., current) to the PCM 110 for the purposes of inducing a phase change. The backend of an integrated circuit typically includes insulating materials, such as dielectric 130, and copper wiring formed in traces, or lines 135 which are connected vertically by vias 140. The backend is a multi-layer interconnect structure which includes wiring for transporting signals between transistors in the front end. Also, the interconnects provide supply voltages, ground, and signals travelling off the integrated circuit.

The PCM 110 may be any material that is capable of changing phase in response to the application of some stimuli (e.g., current or heat). In one embodiment, the PCM 110 comprises chalcogenide glass. Chalcogenide generally includes one or more elements from group 16 of the periodic table (e.g., sulfur, selenium, tellurium). Thus, in various embodiments, a PUF may be comprised of doped $Ge_2Sb_2Te_5$, $AsS$, $As_2S_3$, and various other phase change materials. In some embodiments, the resistance of regions of the PCM 110 may be programmed to different levels. In some embodiments, described in greater detail below, variations in physical properties of the PCM 110 (e.g., surface structures, lattice structures, random or variable hotspots for recrystallization, etc.) can be induced by programming pulse and/or laser anneal. These variations provide measurable differences in the physical properties of the PCM 110 as a basis for use as a PUF. In particular, a signature and key can be derived from the PCM 110 using the measurement circuit 120 (as described above) or other suitable means. Similarly, in some embodiments, PCM materials can be deposited in vias in the backend of an integrated circuit.

According to various embodiments of the present disclosure, the PCM 110 forms the basis for a physical unclonable function. For example, in one embodiment, the measurement circuit 120 may read one or more physical properties of the PCM 110 in order to determine a signature of the physical unclonable function. For instance, the measurement circuit 120 may receive measurements of various responses of the PCM 110 to a stimuli (e.g., a resistance response, a voltage response, a capacitance response, an impedance response, a transmittance, or the like). In the embodiment of FIG. 1, the measurement circuit 120 may measure the response of the PCM 110 by applying one or more signals to the PCM 110 through wires in the vias 140. For instance, measurement circuits comprising voltage controlled ring oscillators have been shown to be suitable for use in measuring PUF devices. However, in other embodiments, different forms of on-chip measurement circuits, including PCM-specific read circuits, may be employed. The response of the PCM 110 may be considered a signature of the PCM 110 (in other words, a physical unclonable function).

Figure 5:
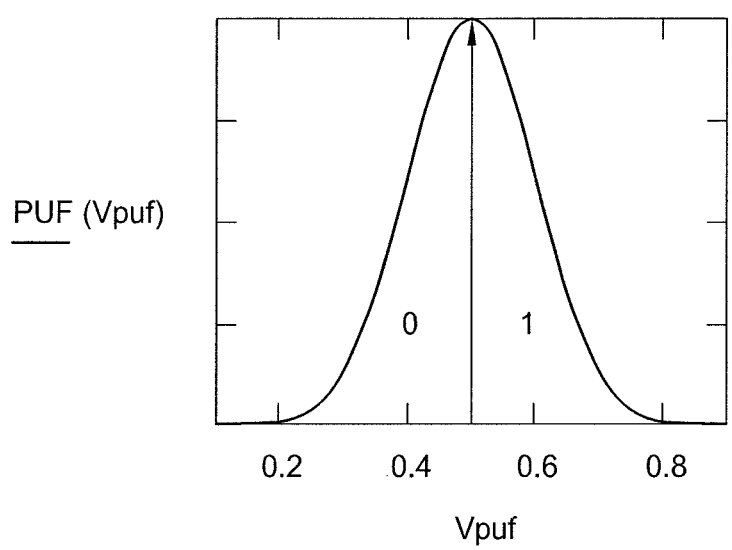
FIG. 5 illustrates an exemplary graph for determining binary keys from physical unclonable function values.

FIG. 5 illustrates an exemplary graph 500 showing a Gaussian distribution of a number of PUF devices versus PUF values/signature values (Vpuf) of the devices, and a cutoff for determining binary keys (e.g., ones and zeros) from physical unclonable function values of the PUF devices. In this case, FIG. 5 may illustrate a cutoff of 0.5 for determining whether a particular PUF value of a PUF device is a one or a zero. The horizontal axis represents Vpuf (the PUF value, which in one embodiment may comprise a threshold voltage, Vt, of the PUF device) and the vertical axis represents the number of PUF devices exhibiting the particular PUF value. For example, in a manufacturing process, an ideal PUF device may have a threshold voltage of 0.5. Thus, a manufacturer would generally prefer a yield with as many devices having a PUF value as close to 0.5 as possible (i.e., little to no variation). However, by implementing the purposeful variability enhancements of the present disclosure, a wider yield curve may be achieved where many more PUF devices (in this case, phase change memory whose cells have been set to exhibit varying degrees of crystallinity) have PUF values greater than or less than 0.5.

Notably, in the example of FIG. 5, the cutoff for determining whether a PUF value is a one or a zero may be 0.5. Any value measured below 0.5 will be categorized as a zero whereas any value measured above 0.5 may be categorized as a one. It should be noted that when the PUF value (Vpuf) is close to the cutoff (e.g., 0.5), changes in temperature and changes over time may cause the PUF value to fluctuate and therefore cause a bit error in the binary key. Thus, the further the PUF value of a particular PUF device can be made away from the cutoff, the less likely it is that time and temperature changes will cause the PUF value to cross the threshold and switch from a zero to a one, or vice versa; hence, the more stable the binary key over time. In addition, although FIG. 5 may relate to PUF values derived from a voltage response (e.g., threshold voltage (Vt)), in other embodiments PUF values may be derived from other measureable properties, such as resistivity, capacitance, impedance or transmittance, among other things. As such, similar cutoffs may be applied to such other values to distinguish between ones and zeros.

Figure 2:
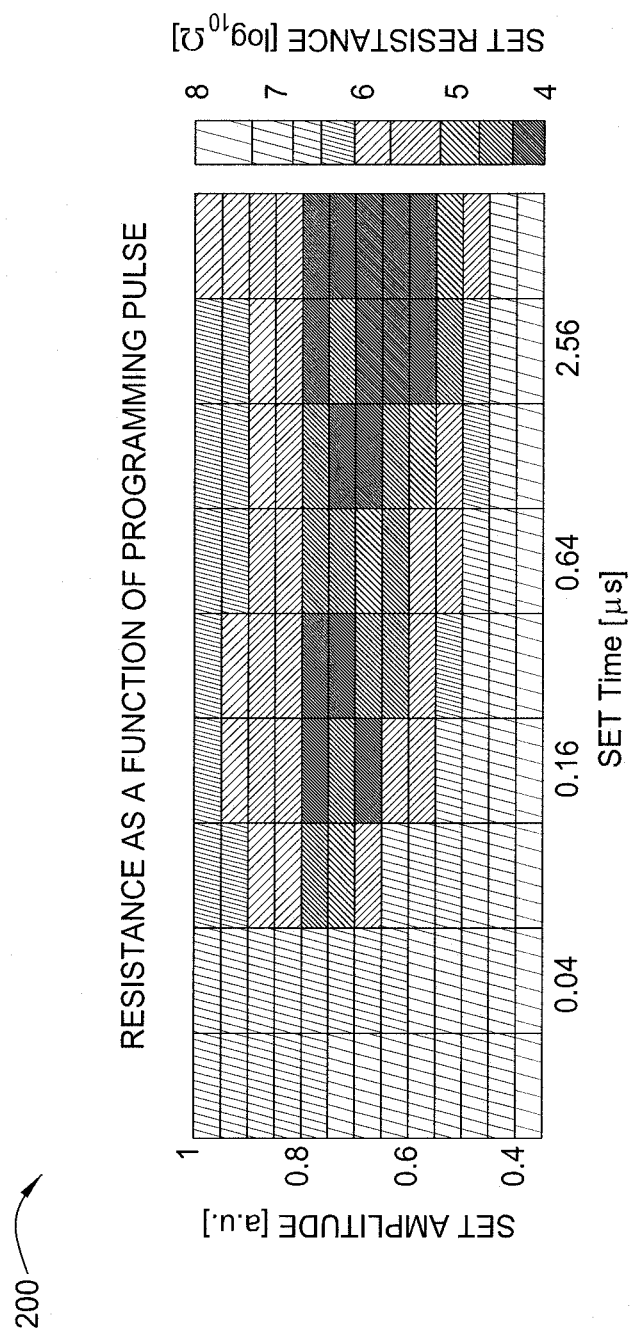
FIG. 2 is a graph illustrating the response of a single cell of a phase change memory to a current pulse.

FIG. 2 is a graph illustrating the response of a single cell of a phase change memory to a current pulse. In particular, the graph plots the resistance of the cell that is achieved by application of a current pulse having a specific amplitude (y axis) and duration (x axis). A reset operation is shown between each set of data points. As illustrated, the resistance of the cell varies greatly with the amplitude and duration of the programming pulse. As discussed above, this is because the amplitude and duration of the programming pulse result in the cell of the phase change material being set in a certain phase (e.g., a phase that is fully amorphous, fully crystalline, or anywhere in between fully amorphous and fully crystalline). The phase determines the resistance of the cell. When the programming pulse is applied to the PCM as a whole, a random distribution of phases occurs over the cells, resulting in a range of different resistance values that is unique to the PCM and that can be used as the PUF.

Figure 3:
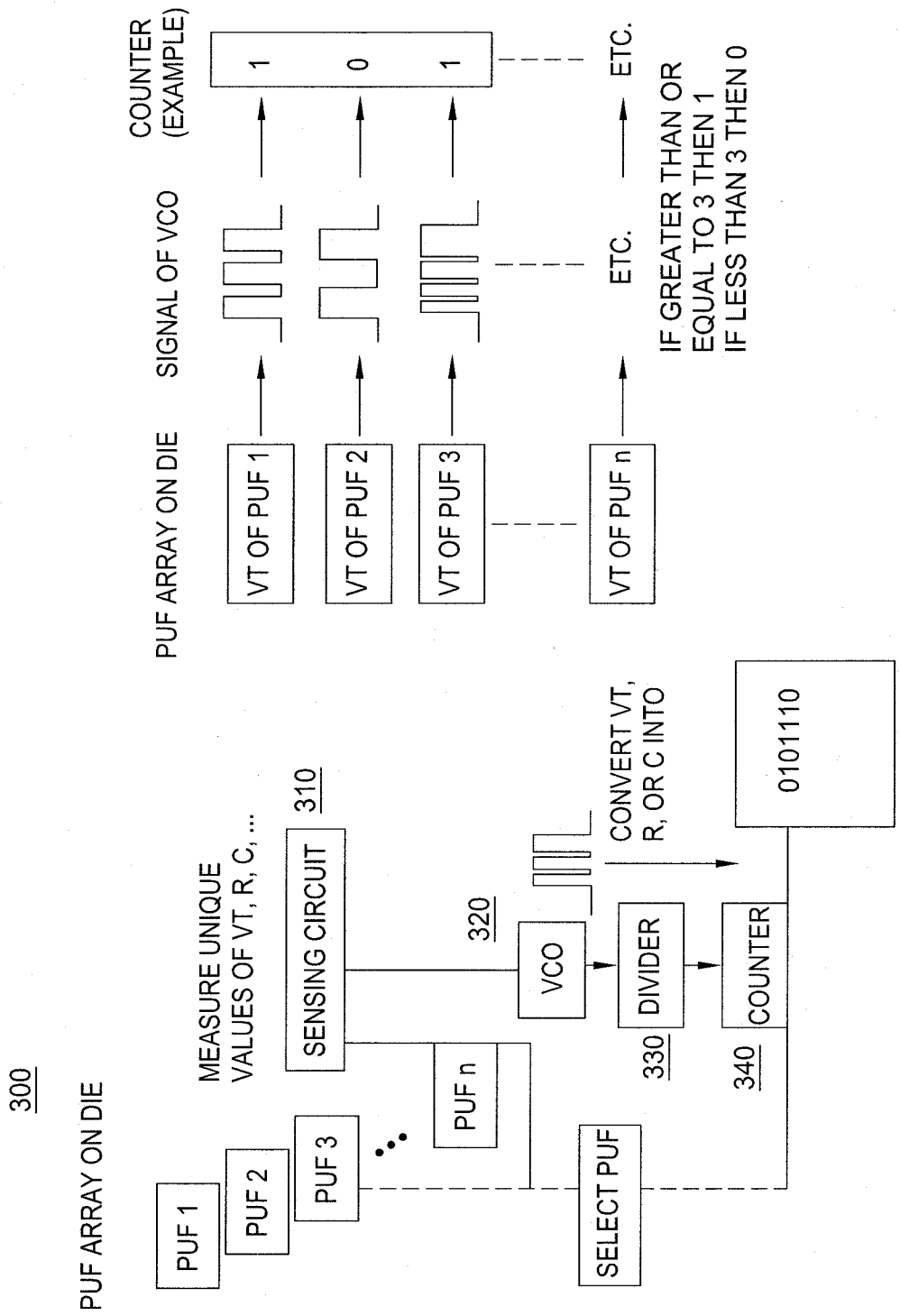
FIG. 3 illustrates the operation of an exemplary measurement circuit, according to embodiments of the present disclosure.

FIG. 3 depicts the operation of an exemplary measurement circuit according to various embodiments of the present disclosure. In particular, FIG. 3 illustrates the operation of a voltage controlled ring oscillator type measurement circuit, which has been shown to be suitable for use in measuring PUF devices and presents one possible way of measuring the PUF devices disclosed herein. However, as discussed above, further embodiments of the invention utilize measurement circuits that are designed specifically for use with phase change memory, such as the measurement circuit described by Close et al. in "A 512 Mb Phase-Change Memory (PCM) in 90 nm CMOS Achieving 2b/Cell," 2011 Symposium on VLSI Circuits (VLSIC 2011), which is herein incorporated by reference in its entirety.

The measurement circuit of FIG. 3 may comprise an on-chip measurement circuit (i.e., located within the integrated circuit itself, such as on a die of the integrated circuit as illustrated in FIG. 1) that is configured to measure a resistance response, a capacitance response, a voltage response, or the like of one or more PUF devices (i.e., structures" or regions— in this case, phase change memory whose cells have been set to exhibit varying degrees of crystallinity) comprising a physical unclonable function. As shown in the left side of FIG. 3, a measurement circuit 300 includes a sensing circuit 310, a voltage controlled oscillator 320, a divider 330 and a counter 340. In one embodiment, the sensing circuit 310 measures one or more structures, or cells of a phase change memory (e.g., PUF1, PUF2, PUF3 . . . PUFn, as shown in FIG. 3). The response(s) of the PCM cells representing the physical unclonable function is used by the sensing circuit to convert the PUF values(s) into a voltage value, or values which will influence the oscillation frequency of the voltage controlled oscillator 320. In some embodiments, the output of the voltage controlled oscillator 320, which may be representative of the PUF value(s) of the PCM cells being measured, is received by the divider 330. The divider 330 and the counter 340 convert the signal of the voltage controlled oscillator that is influenced by the PUF value via the sensing circuit into a digital value, or binary representation. For example, the PUF value correlates to the period, or the number of cycles/oscillations in a given time, of the voltage controlled oscillator signal 320. The period is observed/determined by the counter 340 in order to decide if a particular PUF value should be categorized as a "1" or a "0". This process is repeated over one or more structures/PCM cells being measured in order to create a binary set. According to various embodiments, this binary set (also referred to herein as a code, or key), is used as a cryptographic key to authenticate a device. Notably, the code is never stored in binary foam on the measurement device. It should also be noted that although a binary based key is described, the present disclosure is not so limited. Namely, other, further, and different embodiments may be incorporated in a ternary based system, and the like.

In the right side of FIG. 3, the responses of various individual PUF devices are represented by the PUF values Vt of PUF1, Vt of PUF2, etc., in the first column. The PUF values will influence, through the sensing circuit 310, the number of oscillation periods produced by the voltage controlled oscillator 320, which will then be counted by the counter 340 to determine the binary value. The threshold for distinguishing the binary values can be set by the counter 340 counting the oscillation periods.

One embodiment may also include a temperature sensor and circuitry implementing a temperature compensation algorithm to account for variations in operating temperature of the device. For example, PUF values may vary with respect to temperature over a range of interest. Thus, the temperature compensation algorithm may account for predictable changes to the PUF values with respect to a stable temperature reference. In addition, although one example of an on-chip measurement circuit is depicted and described in connection with FIG. 3, in other, further and different embodiments a measurement circuit may be employed that takes various other forms. For example, a measurement circuit may be employed such as that described in Suh, et al., "Physical Unclonable Functions for Device Authentication and Secret Key Generation", Proceedings of the 44$^{th}$ Design Automation Conference, San Diego, Calif., June 2007, or U.S. patent application Ser. No. 12/032,100, filed Feb. 15, 2008 (Publication No. 2009/0206821, published Aug. 20, 2009), each of which is incorporated by reference herein in its entirety.

As discussed above, the variability of the PCM crystallinity used for the physical unclonable function can be increased by applying a programming pulse to the PCM. For example, in one embodiment, a programming pulse is applied using an electrode such as a metal contact or a photoelectric (e.g., photovoltaic) cell. For example, a programming pulse of between approximately 200 and 500 μA can be applied for several nanoseconds in order to set or reset a cell of the PCM. A fully amorphous or fully crystalline phase may be achieved using a single pulse, while a phase somewhere in between fully amorphous and fully crystalline may be achieved using multiple pulses. For instance, a high current pulse may result in a fully amorphous or near-fully-amorphous phase, while a trapezoidal pulse having a long trailing edge may result in a fully crystalline or near-fully-crystalline phase. In one embodiment, each programming pulse is a box-type rectangular pulse.

As an alternative, the variability of the PCM crystallinity used for the physical unclonable function is increased using a laser anneal. For example, in one embodiment, a laser anneal process involves the use of an excimer laser to induce varying degrees of crystallinity in the cells of the PCM. The random distribution of phases in the PCM ultimately affects the range of resistivity values that can be used as the PUF. In other words, by varying the crystallinity of the PCM cells, this results in variations in the measurable properties of the PCM and leads to more reliable creation of the binary key/secret code value. In some embodiments, the conditions of the laser anneal can be purposefully changed to induce variations within the PCM. For example, the exciting laser wavelength, energy, beam width, pulse duration and other laser properties can all be varied (e.g., from one region of semiconducting material to the next).

In one embodiment, the PCM is deployed in the backend of an integrated circuit as a physical unclonable function, thereby allowing some embodiments to include the PUF structures deployed directly atop of the measurement circuit that generates the binary keys from the PUF values. By placing the measurement circuit and the PUF in two different layers, it makes it more difficult to probe and access the PUF than when the measurement circuit and the PUF are on the same layer. Having the measurement circuit sit below the PUF in the backend may further deter attacks seeking to extract signatures/keys because in order to reach the PCM, the attacker needs to separate the measurement circuit from the backend (i.e., there is no direct access to the PUF). However, without the functioning measurement circuit, the attacker will not know which properties to measure, which stimuli to apply, or to which regions to apply the stimuli. In addition, an attacker cannot access the PUF directly through the backend because there are no wiring connections to the backside. Accordingly, such embodiments of the present disclosure provide a tamper response. If the PUF device and the measurement device/support circuitry are stacked on top of each other, access is blocked from any direction. Therefore, if an attacker tries to get physical access to a PUF signature/key by delayering, probing, or other established failure analysis methods, the PUF and/or measurement circuit is altered or even destroyed in such a way as to prevent regeneration of the key.

Figure 4:
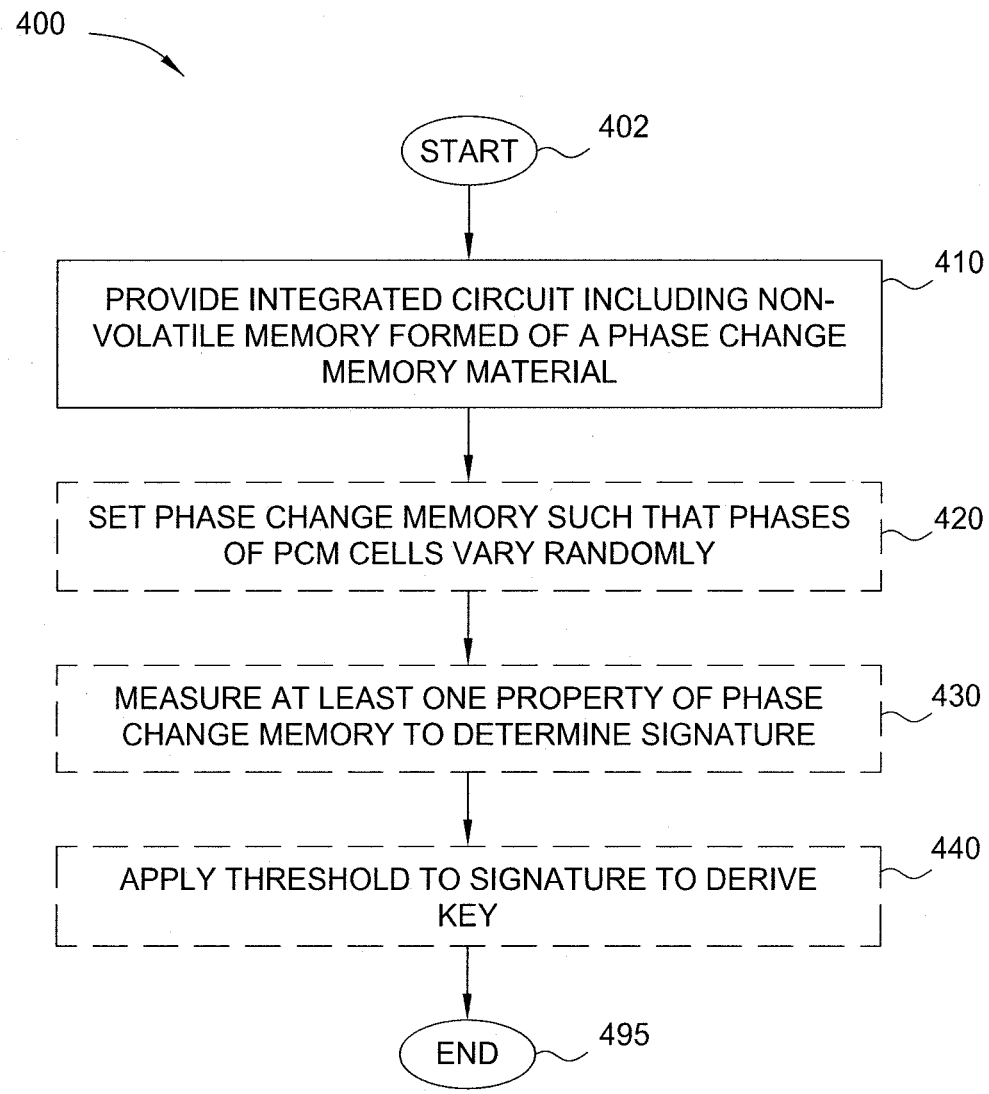
FIG. 4 is a flowchart of a method for manufacturing an exemplary device, according to embodiments of the present disclosure.

FIG. 4 illustrates a flowchart of a method 400 for creating a secure device having a physical unclonable function. In particular, exemplary steps of the method 400 may be performed in accordance with the above described embodiments.

The method 400 begins at step 402 and proceeds to step 410 where an integrated circuit including a non-volatile memory formed of a phase change memory material is provided. As described above, the integrated circuit may further comprise a front end layer formed of a semiconducting material (e.g., silicon), along with other materials, and having formed therein a number of transistors, gates, nets, and the like. The integrated circuit may also comprise a number of backend layers including a dielectric or other insulating materials, vias, and wiring connecting various elements in the front end to each other, to ground, and to power sources, among other things. An exemplary integrated circuit is illustrated in FIG. 1 and described above.

In various embodiments, the PCM in the integrated circuit is used as a physical unclonable function. For example, a measurement circuit embedded in the integrated circuit can determine various physical properties of the PCM and derive a signature and key therefrom. Accordingly, in some cases, steps 420-440 of the method 400 may be performed following step 410. However, not all of these steps need be performed in an exemplary process for forming a secure device in accordance with the method 400. Thus, in some embodiments, following step 410 the method 400 proceeds to step 495, where the method 400 ends. However, in some embodiments, the method 400 proceeds to step 420.

At optional step 420 (illustrated in phantom), the phase change memory is set such that each individual cell of the PCM takes on a phase that is fully amorphous, fully crystalline, or somewhere between fully amorphous and fully crystalline. In one embodiment, these phases are randomly distributed among the cells of the PCM, which leads to much variability in the properties of the PCM and in the analog PUF value(s) of the PCM. In one embodiment, a programming pulse or a laser anneal is used to set the phases of the various PCM cells in step 420.

In optional step 430 (illustrated in phantom), at least one physical property of the PCM is measured to determine a signature. The measurements may be performed using an on-chip measurement circuit that is part of the integrated circuit. Specifically, in some embodiments, the measurement circuit is configured to measure/detect various properties of the PCM as described above in connection with the exemplary measurement circuit 300 in FIG. 3. For instance, the measurement circuit 300 may measure the voltage response, inductance response, resistance response, capacitance response, and other properties of the PCM in order to derive a signature therefrom. The signature may comprise one or more analog values reflecting the response of a particular region of the PCM to an applied signal.

In optional step 440 (illustrated in phantom), a threshold is applied to the signature measured in step 430 to derive a key. For example, as mentioned above, the signature of the PCM may comprise one or more analog waveforms representing the response(s) of the one or more structures/regions of the PCM to applied signals. Accordingly, in one embodiment, a signature for the PCM is derived by using a counter to count the oscillations/period of a voltage controlled oscillator signal, or similar means. In other embodiments, a signature is derived for the PCM using a PCM-specific read circuit that measures the response of the PCM. In addition, a threshold may be applied, such as shown in the example of FIG. 5, to derive a binary representation. In various embodiments, the set of binary representations that is output forms a key for the integrated circuit which may be used for cryptographic and authentication purposes, among other things. For instance, the key may be stored in random access memory (RAM). Thereafter, a processor may access the key from the RAM in order to perform various computations. Since RAM is volatile, when the device's power is shut off, the key is automatically erased from the RAM. Every time the device/chip is turned on, the key needs to be regenerated (e.g., by way of the method 400). It should be noted that although a binary based key is described, the present disclosure is not so limited. Namely, other, further, and different embodiments may be incorporated in a ternary based system, and the like.

At step 495, the method 400 terminates. Accordingly, the steps of the method 400 produce a secure device comprising an integrated circuit having a physical unclonable function (in the form of phase change memory). In some embodiments, the secure device includes a measurement circuit for purposes of extracting a key from the properties of the PCM that can be used for cryptographic and authentication purposes. In addition, although the steps of the method 400 are listed in a particular order, as shown in FIG. 4, it should be noted that alternate embodiments of the present disclosure may implement these steps in a different order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents. In addition, although various embodiments which incorporate the teachings of the present disclosure have been shown and described in detail herein, those skilled in the art can readily devise many other varied embodiments that still incorporate these teachings.

What is claimed is:

1. A method of manufacturing a secure device having a physical unclonable function, the method comprising:
embedding a phase change memory in the secure device, the phase change memory comprising a plurality of cells; and
setting the phase change memory in a manner that results in a non-uniform phase being exhibited over the plurality of cells, wherein the non-uniform phase is manifested by at least two of the plurality of cells being set to different phases, wherein each of the different phases is one of fully amorphous, fully crystalline, or between fully amorphous and fully crystalline, and wherein the non-uniform phase comprises the physical unclonable function; measuring a property of the phase change memory for deriving a signature having one or more physical unclonable function values; and deriving a binary key from the signature, wherein the binary key is derived by applying a threshold to the one or more physical unclonable function values for conversion into a binary code.

2. The method of claim 1, wherein the phase change memory comprises chalcogenide glass.

3. The method of claim 1, wherein the setting comprises: performing a laser anneal on the phase change memory.

4. The method of claim 1, wherein the setting comprises: applying a programming pulse to the phase change memory.

5. The method of claim 1, wherein the property comprises collective resistivity values of individual cells of the plurality of cells.

6. The method of claim 1, wherein the property of the semiconducting material is measured by a measurement circuit.

7. The method of claim 6, further comprising:
deriving a binary key from the signature, wherein the binary key is derived by applying a threshold to the one or more physical unclonable function values, wherein the deriving the binary key from the signature is performed by the measurement circuit.

8. The method of claim 1, wherein the non-uniform phase comprises a random phase variation over the plurality of cells.

9. A method for retrieving a cryptographic key from an integrated circuit, wherein the cryptographic key is stored in the integrated circuit, the method comprising:
measuring a property of a phase change memory embedded in the integrated circuit, wherein the phase change memory comprises a plurality of cells and the property is a function of a non-uniform phase exhibited over the plurality of cells, wherein the non-uniform phase is manifested by at least two of the plurality of cells being set to different phases, wherein each of the different phases is one of fully amorphous, fully crystalline, or between fully amorphous and fully crystalline;
deriving a signature from the property, wherein the signature comprises at least one measured value of the property; and
deriving the cryptographic key from the signature by applying a threshold to the at least one measured value.

10. The method of claim 9, wherein the phase change memory comprises chalcogenide glass.

11. The method of claim 9, wherein the property comprises a resistivity.

12. The method of claim 9, wherein the non-uniform phase comprises a random phase variation over the plurality of cells.

13. The method of claim 1, wherein the setting comprises applying a stimulus to the phase change memory as a whole, including all of the plurality of cells, and wherein the stimulus induces a random distribution of the different phases in the plurality of cells.

14. The method of claim 1, wherein the random distribution is unique to the secure device relative at least to other secure devices manufactured in a common batch with the secure device.

15. The method of claim 1, wherein the embedding comprises deploying the phase change memory in a backend of the secure device.

16. The method of claim 1, further comprising:
placing a measurement circuit in the backend of the secure device, in a separate layer from the phase change memory, wherein the measurement circuit is configured to measure a property of the phase change memory.

* * * * *